United States Patent
Chen et al.

(10) Patent No.: US 10,106,427 B2
(45) Date of Patent: Oct. 23, 2018

(54) METHOD FOR PREPARING NANO SILICA AND NANO CALCIUM CARBONATE USING RICE HULL ASH AND FLUE GAS

(71) Applicant: ZHONGYING CHANGJIANG INTERNATIONAL NEW ENERGY INVESTMENT CO., LTD., Wuhan (CN)

(72) Inventors: Yilong Chen, Wuhan (CN); Yanfeng Zhang, Wuhan (CN); Zhijiu Zhuo, Wuhan (CN); Xingcai Zheng, Wuhan (CN); Zhangjian Fang, Wuhan (CN); Leiming Tao, Wuhan (CN); Yuting Cheng, Wuhan (CN)

(73) Assignee: ZHONGYING CHANGJIANG INTERNATIONAL NEW ENERGY INVESTMENT CO., LTD., Wuhan (CN)

( * ) Notice: Subject to any disclaimer, the term of this patent is extended or adjusted under 35 U.S.C. 154(b) by 110 days.

(21) Appl. No.: 15/190,134

(22) Filed: Jun. 22, 2016

(65) Prior Publication Data

US 2016/0304353 A1     Oct. 20, 2016

Related U.S. Application Data

(63) Continuation-in-part of application No. PCT/CN2014/090888, filed on Nov. 12, 2014.

(30) Foreign Application Priority Data

Dec. 25, 2013  (CN) .......................... 2013 1 0725270

(51) Int. Cl.
| | |
|---|---|
| *C01B 33/18* | (2006.01) |
| *C01B 33/12* | (2006.01) |
| *C01F 11/18* | (2006.01) |
| *B82Y 40/00* | (2011.01) |
| *B82Y 30/00* | (2011.01) |

(52) U.S. Cl.
CPC .............. *C01B 33/18* (2013.01); *C01B 33/12* (2013.01); *C01F 11/181* (2013.01); *B82Y 30/00* (2013.01); *B82Y 40/00* (2013.01); *C01F 11/18* (2013.01); *C01P 2004/64* (2013.01)

(58) Field of Classification Search
CPC ....... C01B 33/18; C01B 33/12; C01F 11/181; C01F 11/18; B82Y 30/00; B82Y 40/00; C01P 2004/64
See application file for complete search history.

(56) References Cited

U.S. PATENT DOCUMENTS 3,902,915 A * 9/1975 Crawford ................. C08K 9/04
                                                        106/485

FOREIGN PATENT DOCUMENTS

| CN | 101898776 A | * 12/2010 | |
| WO | WO-2004073600 A2 | * 9/2004 | .......... B01J 19/0053 |

* cited by examiner

*Primary Examiner* — Anthony J Zimmer
(74) *Attorney, Agent, or Firm* — Matthias Scholl, PC; Matthias Scholl

(57) ABSTRACT

A method for preparing nano silica and nano calcium carbonate using rice hull ash and flue gas. The method includes: 1) adding rice hull ash to a sodium hydroxide solution, to yield a first mixed solution; stirring and heating the first mixed solution; then filtering the first mixed solution to yield a first filtrate; 2) adding the first filtrate to a reaction still, and diluting the first filtrate; adding polyethylene glycol as a dispersant to the reaction solution; introducing flue gas to the reaction solution; filtering the reaction mixture to yield a first filter cake and a second filtrate; washing the first filter cake to a neural pH, slurrying and drying the first filter cake to yield nano silica; and 3) mixing the second filtrate and a washing solution collected from 2); adding a calcium hydroxide solution to the reaction still, to yield nano calcium carbonate.

7 Claims, No Drawings

METHOD FOR PREPARING NANO SILICA AND NANO CALCIUM CARBONATE USING RICE HULL ASH AND FLUE GAS

CROSS-REFERENCE TO RELATED APPLICATIONS

This application is a continuation-in-part of International Patent Application No. PCT/CN2014/090888 with an international filing date of Nov. 12, 2014, designating the United States, now pending, and further claims priority benefits to Chinese Patent Application No. 201310725270.4 filed Dec. 25, 2013. The contents of all of the aforementioned applications, including any intervening amendments thereto, are incorporated herein by reference.

BACKGROUND OF THE INVENTION

Field of the Invention

The invention relates to a method for preparing nano silica and nano calcium carbonate using rice hull ash and flue gas from biomass power plant.

Description of the Related Art

Conventional methods for preparing silica using rice hull ash involve complex and expensive equipment. The process flow is difficult to control, the yield of silica is low, and the produced silica often has large particle sizes.

SUMMARY OF THE INVENTION

In view of the above-described problems, it is one objective of the invention to provide a method for preparing nano silica and nano calcium carbonate using rice hull ash and flue gas from a biomass power plant. The silica and calcium carbonate prepared by the method have ultrafine nano-sized particles.

To achieve the above objective, in accordance with one embodiment of the invention, there is provided a method for preparing nano silica and nano calcium carbonate using rice hull ash and flue gas, comprising:

1) adding rice hull ash from a biomass power plant to a sodium hydroxide solution having a concentration of between 10 and 20 wt. %, to yield a first mixed solution; stirring and heating the first mixed solution to a temperature of between 95 and 100° C. and allowing the first mixed solution to react for 3 to 4 hrs; then filtering the first mixed solution to yield a first filtrate; where the rice hull ash comprises between 80 and 90 wt. % of $SiO_2$, a BET specific surface area thereof is between 40 and 100 m$^2$/g, and a crystal structure of $SiO_2$ is amorphous;

2) adding the first filtrate of 1) to a reaction still, and diluting the first filtrate using water so that a mass percentage concentration of silica of sodium silicate in a diluted reaction solution to be between 8 and 15%; heating the reaction still to 60 to 80° C., and adding polyethylene glycol as a dispersant of a non-ionic surfactant to the reaction solution to form a reaction mixture, where a dosage of the dispersant is between 0.1 and 5 wt. % of a content of silica of the sodium silicate in the first filtrate of 1); introducing flue gas from the biomass power plant at normal pressure to the reaction solution; stirring and allowing the reaction mixture to react for 2 and 4 hrs; filtering the reaction mixture to yield a first filter cake and a second filtrate; washing the first filter cake until it has a neutral pH, slurrying, and spray drying the first filter cake to yield nano silica; and 3) mixing the second filtrate and a washing solution collected from 2) to yield a second mixed solution; adding the second mixed solution to the reaction still and heating the reaction still to 50 to 70° C.; adding a calcium hydroxide solution to the reaction still and stirring to allow to react for 0.5 to 2 hrs; filtering and washing a resulting product to yield a second filter cake and a third filtrate; drying the second filter cake in a flash dryer to yield nano calcium carbonate.

In a class of this embodiment, a mass ratio of the rice hull ash to sodium hydroxide in the sodium hydroxide solution in 1) is between 2:1 and 3:1.

In a class of this embodiment, in 2), a volume percentage of carbon dioxide in the flue gas is between 12 and 20% (v/v); a ratio of a volume of carbon dioxide in the flue gas to a mass of silica of the sodium silicate in the first filtrate collected in 1) is between 0.3 and 4.2 m$^3$/kg.

In a class of this embodiment, after the reaction of the flue gas is completed, no more flue gas is introduced; the reaction solution is continued to be stirred and aged for between 10 and 30 min.

In a class of this embodiment, the polyethylene glycol of the non-ionic surfactant in 2) is polyethylene glycol having a number-average molar mass of between 500 and 4000.

In a class of this embodiment, a concentration of the calcium hydroxide solution in 3) is between 6 and 20 wt. %; after the reaction of the calcium hydroxide solution is completed, the reaction solution is continued to be stirred and aged for between 10 and 30 min.

In a class of this embodiment, the third filtrate and a washing solution collected in 3) are recycled for use in 1).

Advantages of the method for preparing nano silica and nano calcium carbonate using rice hull ash and flue gas are summarized as follows:

1) The dissolution rate of silica is more than 90%. The entire reaction process is carried out at normal temperature, thus the method is simple, safe, and cheap to operate.

2) The silica and the calcium carbonate are produced in the presence of the dispersant, thus the products have ultrafine nano-sized particles. The dispersant is recycled in the entire reaction process, thereby reducing waste and costs.

3) Optionally, the flue gas is the gas meeting the emission standard, or purified gas.

4) Waste residue and waste gas produced by the biomass power plant are consumed, thereby preventing the pollution. In addition, the filtrate and the washing solution produced in the entire reaction process are recycled, thereby achieving zero discharge of pollutants.

DETAILED DESCRIPTION OF THE EMBODIMENTS

For further illustrating the invention, experiments detailing a method for preparing nano silica and nano calcium carbonate using rice hull ash and flue gas are described below. It should be noted that the following examples are intended to describe and not to limit the invention.

Example 1

1) 74 kg of rice hull ash ($SiO_2$ content was 90 wt. %; BET specific surface area was 60 m$^2$/g; the crystal structure $SiO_2$ was amorphous), which was waste of rice hull combustion for power generation in a biomass power plant, was added to sodium hydroxide solution with a concentration of 15 wt. % to form a first mixed solution, where a mass ratio of the rice hull ash to sodium hydroxide in the sodium hydroxide solution is 2.8:1. The first mixed solution was stirred and heated to 96° C., and the temperature was kept to perform a first reaction for 3.5 hrs. Then the first mixed solution was filtered to yield a first filtrate.

2) The first filtrate of 1) was added to a reaction still, and diluted by water to control a mass percentage concentration of sodium silicate (based on the silica content) in a reaction solution to be 15%. The reaction still was stirred and heated to 70° C., and 1 kg of dispersant polyethylene glycol (PEG) 2000 was added to the reaction solution to form a reaction mixture. At normal pressure, flue gas which was waste gas in the biomass power plant was continuously introduced at a speed of 300 m$^3$/h into the reaction solution, where a volume percentage of carbon dioxide in the flue gas is between 12 and 20% (v/v). The reaction mixture was stirred to perform a second reaction for 2.5 hrs. Then no more flue gas was introduced. The stirring of the reaction solution was continued, and the reaction mixture was aged for 30 min. The reaction mixture was filtered by a filter press to yield a first filter cake and a second filtrate. The first filter cake was washed to be neutral, slurried, and spray dried to yield the nano silica.

3) The second filtrate and a washing solution obtained in 2) were mixed to form a second mixed solution. The second mixed solution was pumped into the reaction still and was heated to 70° C. Calcium hydroxide solution with a concentration of 10 wt. % and having 30 kg of calcium hydroxide was added to the reaction still and stirred to perform a third reaction for 1 h. After the third reaction, the stirring of the reaction solution was continued, and the reaction solution was aged for 15 min. Then the second mixed solution was filtered to yield a second filter cake and a third filtrate, and the second filter cake was washed to be neutral. The second filter cake was dried in a flash dryer to yield the nano calcium carbonate.

4) The third filtrate and a washing solution obtained in 3) were mixed and pumped to 1) for use as an alkali solution. The dissolution rate of silica in 1) and characteristics of nano silica and nano calcium carbonate prepared by the example are shown in Table 1. The dissolution rate of silica is a mass percentage of sodium silicate (based on the silica content) in the first filtrate of 1) to silica in the rice hull ash.

TABLE 1

Dissolution rate of silica and characteristics of nano silica and nano calcium carbonate

| | Items | Example 1 | Example 2 | Example 3 |
|---|---|---|---|---|
| | Dissolution rate of silica (%) | 91 | 93 | 93 |
| Nano silica | Particle size (nm) | 30 | 25 | 20 |
| | Whiteness (wg) | 96 | 96 | 99 |
| | Content (%) | 97 | 98 | 99 |
| Nano calcium carbonate | Particle size (nm) | 45 | 40 | 30 |
| | Whiteness (wg) | 95 | 95 | 98 |
| | Content (%) | 97 | 97 | 98 |

Example 2

1) 74 kg of rice hull ash (SiO$_2$ content was 80 wt. %; BET specific surface area was 100 m$^2$/g; the crystal structure SiO$_2$ was amorphous), which was waste of rice hull combustion for power generation in a biomass power plant, was added to sodium hydroxide solution with a concentration of 12 wt. % to form a first mixed solution, where a mass ratio of the rice hull ash to sodium hydroxide in the sodium hydroxide solution is 2.6:1. The first mixed solution was stirred and heated to 97° C., and the temperature was kept to perform a first reaction for 3 hrs. Then the first mixed solution was filtered to yield a first filtrate.

2) The first filtrate of 1) was added to a reaction still, and diluted by water to control a mass percentage concentration of sodium silicate (based on the silica content) in a reaction solution to be 10%. The reaction still was stirred and heated to 65° C., and 1 kg of dispersant PEG3000 was added to the reaction solution to form a reaction mixture. At normal pressure, flue gas which was waste gas in the biomass power plant was continuously introduced at a speed of 500 m$^3$/h to the reaction solution, where a volume percentage of carbon dioxide in the flue gas is between 12 and 20% (v/v). The reaction mixture was stirred to perform a second reaction for 2 hrs. Then no more flue gas was introduced. The stirring of the reaction solution was continued, and the reaction mixture was aged for 30 min. The reaction mixture was filtered to yield a first filter cake and a second filtrate. The first filter cake was washed to be neutral, slurried, and spray dried to yield the nano silica.

3) The second filtrate and a washing solution obtained in 2) were mixed to form a second mixed solution. The second mixed solution was pumped into the reaction still and was heated to 65° C. Calcium hydroxide solution with a concentration of 8 wt. % was added to the reaction still and stirred to perform a third reaction for 1.5 h. After the third reaction, the stirring of the reaction solution was continued, and the reaction solution was aged for 15 min. Then the second mixed solution was filtered to yield a second filter cake and a third filtrate, and the second filter cake was washed to be neutral using the detergent. The second filter cake was dried in a flash dryer to yield 40 kg of nano calcium carbonate.

4) The third filtrate and the detergent were mixed and pumped to 1) for use as an alkali solution. The dissolution rate of silica in 1) and characteristics of nano silica and nano calcium carbonate prepared by the example are shown in Table 1.

Example 3

1) Rice hull ash (SiO$_2$ content was 90 wt. %; BET specific surface area was 100 m$^2$/g; the crystal structure SiO$_2$ was amorphous) which was waste of rice hull combustion for power generation in the biomass power plant was added to sodium hydroxide solution with a concentration of 10 wt. % to form a first mixed solution. The first mixed solution was stirred and heated to 98° C., and the temperature was kept to perform a first reaction for 3 hrs. Then the first mixed solution was filtered to yield a first filtrate.

2) The first filtrate of 1) was added to a reaction still, and diluted by water to control a mass percentage concentration of sodium silicate (based on the silica content) in a reaction solution to be 8%. The reaction still was stirred and heated to 60° C., and a dispersant PEG3000 was added to the reaction solution to form a reaction mixture, where the amount of the dispersant is 0.5 wt. % of the sodium silicate (based on the silica content) in the first filtrate of 1). At normal pressure, flue gas which was waste gas experiencing purification in the biomass power plant was continuously introduced at a speed of 250 m$^3$/h into the reaction solution, where a volume percentage of carbon dioxide in the flue gas is between 12 and 20% (v/v). The reaction mixture was stirred to perform a second reaction for 3.5 hrs. Then no more flue gas was introduced. The stirring of the reaction solution was continued, and the reaction mixture was aged for 30 min. The reaction mixture was filtered to yield a first filter cake and a second filtrate. The first filter cake was washed to be neutral, slurried, and spray dried to yield the nano silica.

3) The second filtrate and a washing solution obtained in 2) were mixed to yield a second mixed solution. The second mixed solution was pumped into the reaction still and was heated to 60° C. Calcium hydroxide solution with a concentration of 6 wt. % was added to the reaction still and stirred to perform a third reaction for 2 hrs. After the third reaction, the stirring of the reaction solution was continued, and the reaction solution was aged for 15 min. Then the second mixed solution was filtered to yield a second filter cake and a third filtrate, and the second filter cake was washed to be neutral using the detergent. The second filter cake was dried in a flash dryer to yield the nano calcium carbonate.

4) The third filtrate and a washing solution obtained in 3) were mixed and pumped to 1) for recycling. The dissolution rate of silica in 1) and characteristics of nano silica and nano calcium carbonate prepared by the example are shown in Table 1.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing silica and calcium carbonate, the method comprising:
   1) adding rice hull ash from a biomass power plant to a sodium hydroxide solution having a concentration of between 10 and 20 wt. %, to yield a first mixed solution; stirring and heating the first mixed solution to a temperature of between 95 and 100° C. and allowing the first mixed solution to react for 3 to 4 hrs; then filtering the first mixed solution to yield a first filtrate; wherein the rice hull ash comprises between 80 and 90 wt. % of $SiO_2$, a BET specific surface area thereof is between 40 and 100 $m^2/g$, and a crystal structure of $SiO_2$ is amorphous;
   2) adding the first filtrate of 1) to a reaction still, and diluting the first filtrate using water so that a mass percentage concentration of silica of sodium silicate in a diluted reaction solution to be between 8 and 15%; heating the reaction still to 60 to 80° C., and adding polyethylene glycol as a dispersant to the reaction solution to form a reaction mixture, wherein an amount of the dispersant is between 0.1 and 5 wt. % of a content of silica of the sodium silicate in the first filtrate of 1); introducing flue gas from the biomass power plant at atmospheric pressure to the reaction solution; stirring and allowing the reaction mixture to react for 2 and 4 hrs; filtering the reaction mixture to yield a first filter cake and a second filtrate; washing the first filter cake until the first filter cake has a neutral pH, slurrying, and spray drying the first filter cake to yield silica; whereby the silica has a particle size between 20 nm and 30 nm; and
   3) mixing the second filtrate and a washing solution collected from 2) to yield a second mixed solution; adding the second mixed solution to the reaction still and heating the reaction still to 50 to 70° C.; adding a calcium hydroxide solution to the reaction still and stirring to allow to react for 0.5 to 2 hrs; filtering and washing a resulting product to yield a second filter cake and a third filtrate; drying the second filter cake in a flash dryer to yield calcium carbonate; whereby the calcium carbonate has a particle size between 30 nm and 45 nm.

2. The method of claim 1, wherein a mass ratio of the rice hull ash to sodium hydroxide in the sodium hydroxide solution in 1) is between 2:1 and 3:1.

3. The method of claim 1, wherein in 2), a volume percentage of carbon dioxide in the flue gas is between 12 and 20% (v/v); a ratio of a volume of carbon dioxide in the flue gas to a mass of silica of the sodium silicate in the first filtrate collected in 1) is between 0.3 and 4.2 $m^3/kg$.

4. The method of claim 1, wherein in 2), after the reaction of the flue gas is completed, no more flue gas is introduced; the reaction solution is continued to be stirred and aged for between 10 and 30 min.

5. The method of claim 1, wherein the polyethylene glycol in 2) has a number-average molar mass of between 500 and 4000.

6. The method of claim 1, wherein a concentration of the calcium hydroxide solution in 3) is between 6 and 20 wt. %; after the reaction of the calcium hydroxide solution is completed, the reaction solution is continued to be stirred and aged for between 10 and 30 min.

7. The method of claim 1, wherein the third filtrate and a washing solution collected in 3) are recycled for use in 1).

* * * * *